United States Patent [19]

Manion

[11] Patent Number: 4,835,537
[45] Date of Patent: May 30, 1989

[54] TELEMETRY BURST COLLISION AVOIDANCE SYSTEM

[76] Inventor: James H. Manion, 1881 Galveston St., San Diego, Calif. 92110

[21] Appl. No.: 231,586

[22] Filed: Aug. 8, 1988

Related U.S. Application Data

[63] Continuation of Ser. No. 886,036, Jul. 16, 1986, abandoned.

[51] Int. Cl.⁴ .............................................. G01S 3/02
[52] U.S. Cl. ..................................... 342/30; 364/461; 340/961
[58] Field of Search .................. 340/961; 342/29–33, 342/37, 38, 40, 42, 455, 456; 364/461, 423, 443, 460

[56] References Cited

U.S. PATENT DOCUMENTS

| | | | |
|---|---|---|---|
| 3,025,521 | 3/1962 | Tatel et al. | 342/455 |
| 3,055,001 | 9/1962 | Ricketts | 342/36 |
| 3,755,767 | 8/1973 | Breckman | 342/30 |
| 3,775,767 | 11/1973 | Fielding | 342/37 |
| 3,801,979 | 4/1974 | Chisholm | 342/31 |
| 3,808,598 | 4/1974 | Carter | 364/461 X |
| 3,868,497 | 2/1975 | Vietor | 364/440 |
| 4,060,805 | 11/1977 | McComas | 342/38 |
| 4,161,729 | 7/1979 | Schneider | 342/32 |
| 4,167,006 | 9/1979 | Funatsu et al. | 364/461 |
| 4,196,474 | 4/1980 | Buchanan et al. | 342/461 |
| 4,197,538 | 4/1980 | Storker | 342/32 |
| 4,218,679 | 8/1980 | Bohm et al. | 342/47 |
| 4,274,096 | 6/1981 | Dennison | 342/456 |
| 4,380,050 | 4/1983 | Tanner | 364/461 |
| 4,417,248 | 11/1983 | Mathews | 364/461 |
| 4,432,088 | 2/1984 | Frankel | 370/85 |
| 4,454,510 | 6/1984 | Crow | 342/32 |
| 4,646,244 | 2/1987 | Bateman et al. | 364/461 |

Primary Examiner—Thomas H. Tarcza
Assistant Examiner—Tod Swann

[57] ABSTRACT

An aircraft collision avoidance system providing warning and avoidance manuevers for all fixed and moving obstructions that threaten the safe navigation of the host aircraft. The system is effective against threatening aircraft, runway maintenance vehicles and prominent geographic obstructions such as radio towers and mountain peaks. It is an economical combination of basic telemetry equipment (transmitter/receiver) and current personal computer components configured to broadcast its host location and intended movement while simultaneously receiving the same information from all nearby similarly equipped stations, either air or ground. Maximum effectiveness is attained when data is available from the Global Positioning System but alternative sources of navigational information including dead reckoning are provided for. Althrough intended primarily for aviation use, the same technology and concepts are valid for the safe transit of ships and railway equipment.

1 Claim, 6 Drawing Sheets

| NUMBER OF BITS | 8 | 4 | 22 | 22 | 12 | 12 | 12 | 8 |
|---|---|---|---|---|---|---|---|---|
| PARAMETER | CHECK SUM | TYPE | LAT | LONG | ALT | VEL NORTH | VEL EAST | ALT RATE |

| NUMBER OF BITS | 8 | 4 | 22 | 22 | 12 | 12 | 12 | 8 |
|---|---|---|---|---|---|---|---|---|
| PARAMETER | CHECK SUM | TYPE | LAT | LONG | ALT | VEL NORTH | VEL EAST | ALT RATE |

FIG. 3

| TYPE | X POSIT | Y POSIT | FUTURE X POSIT | FUTURE Y POSIT | ALT | ALT RATE | VEL NORTH | VEL EAST | TIME |
|---|---|---|---|---|---|---|---|---|---|
| | | | | | | | | | |

TELEMETRY BURST COLLISION AVOIDANCE SYSTEM

This is a continuation of application Ser. No. 886,036 now abandoned.

CROSS REFERENCES TO RELATED APPLICATIONS

U.S. Patent Documents

U.S. Pat. No. 3,055,001 9/1962 to Ricketts . . . 343/6.5 R
U.S. Pat. No. 3,755,811 8/1973 to Breckman . . . 343/112 CA X
U.S. Pat. No. 3,775,767 11/1973 to Fielding . . . 343/6.5 R
U.S. Pat. No. 3,801,979 4/1974 to Chisholm . . . 343/112 CA X
U.S. Pat. No. 3,868,497 2/1975 to Vietor . . . 364/430 X
U.S. Pat. No. 4,060,805 11/1977 to McComas . . . 343/112 TC X
U.S. Pat. No. 4,128,839 12/1978 to McComas . . . 343/112 CA
U.S. Pat. No. 4,196,474 4/1980 to Buchanan et al. . . . 364/441 X
U.S. Pat. No. 4,218,679 8/1980 to Bohm et al. . . . 343/6.5 R
U.S. Pat. No. 4,274,096 6/1981 to Dennison . . . 343/112 TC
U.S. Pat. No. 4,454,510 6/1984 to Crow . . .

BACKGROUND OF THE INVENTION

Several tragic accidents over the years have emphasized the need for an airborne collision avoidance system. Notable among these were the collision of two Boeing 747 type aircraft on the airport runway at Santa Cruz de Tenerife, Canary Islands and the mid-air collision of a scheduled airliner with a training airplane over the city of San Diego, Calif. The Tenerife accident occurred on 27 Mar. 1977 and claimed 582 lives. The San Diego collision toll was 144 lives including seven persons on the ground, occurring on 25 Sept. 1978. More recently, two commercial sight-seeing aircraft, operating under visual flight rules, collided over the Grand Canyon in June of 1986 with 26 lives being lost.

The steady increase in air traffic which continues to this time make such accidents an ever present danger. Various sources have reported the number of near-miss incidents each year as numbering in the hundreds. While the precise number of these occurrences are in some dispute all parties are agreed that the hazard is real and that urgent action is required to attain a more safe environment for the air traveler.

Efforts to achieve a greater degree of air safety have been made with some measure of success. Most effective have been those measures which have improved the precision and response times of air traffic control equipment in the air terminal locality. For obvious reasons, the air traffic density is high in such areas making close approaches a matter of necessity. Methods of improving the human factors considerations of air control have also been stressed. Generally, these relate to improved working conditions, adequate rest periods and similar actions to ease the physical and mental burdens of air control operators.

The aircraft pilot bears ultimate responsibility for the safety of his flight and to date has received little in the way of an efficient and economical monitoring system which could warn of impending danger. Various proposals have been made but have failed to generate an enthusiastic endorsement in the aviation community. Perhaps cost is the greatest cause of this lack as most general aviation operators do not have the resources to expend on expensive and complex warning systems. Another factor involved is complexity. The aircraft cockpit is currently complicated by a multiplicity of indicators related to flight operation and safety. Any new display must be compact, germane and non-ambiguous to gain entry to this arena.

The Telemetry Burst Collision Avoidance System (TBCAS) of the present invention is capable of warning the pilot of impending collision with another aircraft, a runway maintenance vehicle or a mountain peak. It performs this function automatically without recourse to the information held in the air traffic control center and thus permits the pilot to monitor directly the adequacy of specific guidance received from that center. Conversely, it permits a suitably equipped air traffic control center to monitor the performance of other sensor equipment, principally radars, and of pilot response to flight recommendations. It accomplishes this using airborne equipment approximating the complexity of a citizen-band radio transceiver and a personal computer. The cost of the complete system for each aircraft, runway maintenance vehicle or ground obstruction should not exceed two thousands dollars. TBCAS depends upon each station, either ground or air, having a precise record of its current geographic location in world wide coordinates of latitude and longitude. The primary source for this data is expected to be the Global Positioning System, although provision is made for use of alternate sources such as TACAN, LORAN or other radionavigation aids and for dead-reckoning calculations.

OBJECTS AND SUMMARY OF THE INVENTION

It is the general object of this invention to provide the pilot of each aircraft with apparatus to report the geographic location, course, speed, pressure altitude and rate of climb of all moving and stationary points relevant to safe aircraft operation which exist within a predetermined range of the pilots own aircraft, to provide the pilot with alerts for those which represent possible collision danger and to provide the pilot with a recommended maneuver to avoid such collision.

In consonance with the first object, it is also an object of this invention to provide an apparatus which automatically reports the location, course, speed, pressure altitude and rate of climb of the pilots own aircraft to all other similarly equipped stations, both ground and air, within a predetermined range of the pilots own aircraft.

In consonance with the first two objects, it is an object of this invention to provide a means of performing the data processing tasks required to receive, evaluate and display for human interpretation, all navigational information provided by the system.

Also in consonance with the first two objects it is an object of this invention to provide a means of inter-station communication utilizing a single radio frequency such that a circuit discipline is automatically maintained thereby eliminating the mutual interference effects concomitant with simultaneous radio transmissions by two or more stations.

DETAILED DESCRIPTION OF THE PREFERRED EMBODIMENT

Figure 1:
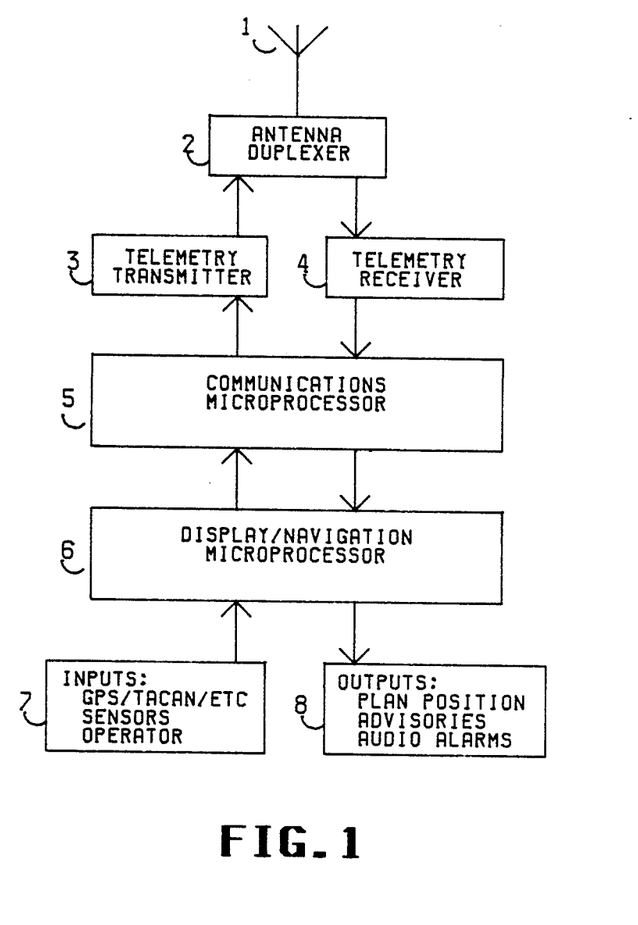
FIG. 1 is a block diagram showing the relationships among the major components of the TBCAS.

A block diagram of the telemetry burst collision avoidance system (TBCAS) is shown in FIG. 1. The diagram shows the necessary and sufficient elements to be carried by all aircraft to permit adequate system operation. Geographic points and ground vehicles would use the same components as shown.

The antenna 1 is a slotted cylinder providing omnidirectional coverage in free space. When sized for L-Band (1-2 Gigahertz) operation it is approximately 1 inch in diameter and 14 inches long. It is located at the extreme forward portion of the aircraft or alternatively at the top portion of the leading edge of the vertical stabilizer. The objective of antenna and antenna location selection is to obtain a nearly perfect spherical radiation pattern for both transmission and reception.

The antenna duplexer 2 switches the antenna between the transmitter and receiver as controlled by the transmitter.

The telemetry receiver 3 is of single frequency construction to operate at the selected frequency as a telemetry receiver of fm-fm type signals. This modulation scheme was developed by the U.S. Navy nearly forty years ago. It depended upon a series of sub-carriers of the main transmitter frequency each of which was further frequency modulated to report the action of a specific input transducer at the transmitter site, usually a guided missile. In the present application the various sub-carriers are not modulated and are interpreted by the receiver as digital 1 or 0 as indicated by the presence or absence of the given subcarrier. As used in this invention a total of eight sub-carriers are used which permit the parallel or simultaneous reception of eight bits of digital information. The receiver monitors the individual sub-carriers over a comparatively long time period and by pulse stretching techniques avoids loss of transmitted bits which occur as a result of multipath propagation effects. The receiver output bits are held on data lines until sampled by the communications microprocessor at which time the data lines are zeroed and a new reception period is begun for the next eight bits. The objective of the receiver design is to attain error-free reception of transmitted signals which are constrained by frequency sharing considerations to short duration. While this embodiment calls for fm-fm telemetry techniques other telemetry methods such as pulse code, phase, frequency shift key and amplitude modulation are applicable to the task and are not excluded.

The telemetry transmitter 4 is designed to generate a short duration (burst) fm-fm modulated radio-frequency signal reporting the aircraft or ground station parameters necessary to proper system operation. The signal is constrained to exhibit a narrow bandwidth adequate for the modulation involved at the specified L-band frequency used by all other TBCAS units. The peak envelope power is restricted to a value sufficient to insure solid communication to a distance not exceeding the air volume radius of the monitored airspace. The low duty cycle or on/off ratio of the transmitter permits usage of a relatively low average power radio frequency output element. The transmitter is controlled by the communications microprocessor and in turn controls the action of the duplexer and receiver.

The communications microprocessor 5 executes an embedded program which enables the transmission/reception periods as required, decodes incoming reports making them available to the display/navigation microprocessor and relays the own station report from the display/navigation microprocessor to the transmitter. The embedded program has the essential task of preventing interference with another station by controlling the timing of the output radio report.

The display/navigation microprocessor 6 executes an embedded program which constructs a report table containing all recent incoming reports, formats a plan position display of the report table contents, deletes outdated reports within the report table and constructs an own station report for submission to the communications microprocessor.

The input data 7 required is obtained from radio navigation aids such as the Global Positioning System (GPS), Tactical Air Navigation System (TACAN), Long Range Navigation System (LORAN); from on-board sensors reporting heading, speed, altitude, rate-of-climb and from operator inputs to over-ride, modify or substitute for any of these.

The system outputs 8 are a plan position indicator(-PPI) display, initialization/manuevering advisories and audio alarms for significant events.

Figure 2:
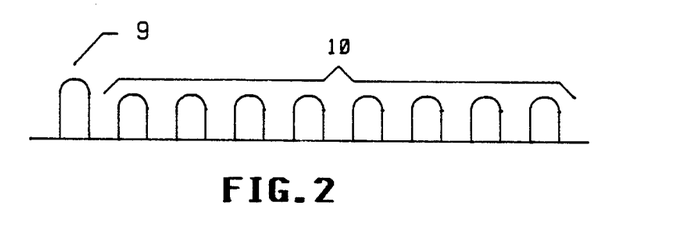
FIG. 2 depicts that portion of the radio frequency spectrum occupied by the telemetry carrier and sub-carriers.

FIG. 2 is a representation of that portion of the radio frequency spectrum occupied by the TBCAS transmitter. The carrier 9 is shown leftmost with the eight sub-carriers 10 shown occupying bands above or higher in frequency than the carrier. The various subcarriers are switched on and off to indicate a binary 1 and 0 respectively. This coding arrangement permits the simultaneous or parallel transmission of eight bits of a digital report.

Figure 3:
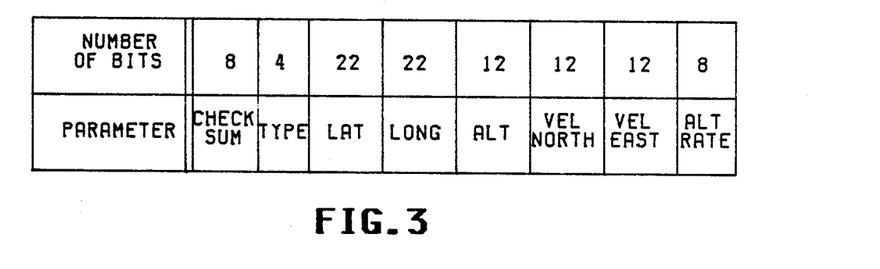
FIG. 3 shows the format of the 100 bit report transmitted by each TBCAS station.

FIG. 3 presents the station report to be transmitted by each station during a predetermined time interval. It is designed to contain the minimum data necessary to system operation so that the transmitter on-time is held to a minimum. This is of concern because all stations within a given area are sharing the selected frequency of operation. Within FIG. 3 each data element is tagged with an abbreviated name and is referred to as a field. The leftmost field is called the check sum and indicates the number of 'on' bits in the remainder of the report. These are used to validate the report, insuring against the use of spurious data. The next field, type, provides an identification of the transmitting station as either airplane, ground vehicle, runway or ground obstruction. Latitude and longitude are reported in the two following fields each using 22 bits which provide a precision of approximately ten yards corresponding to the ultimate precision of the Global Positioning System currently under implementation. The alt field, pressure altitude, uses 12 bits to report values in 20 foot increments giving a maximum of 81,920 feet with negative values excluded. Vel north and vel east, are velocity components scaled in yards per second. They are derived from heading and speed and each uses 12 bits. Minus values indicate south and west movement. Maximum values of speed possible are approximately 3600 nautical miles per hour (knots). Alt rate or rate of climb is reported in 8 bits covering the range 12700 positive or negative feet per minute when scaled in hundreds of feet per minute. Note that this report permits location of a geographic station anywhere in the general vicinity of the runway, radio tower, etc. being reported. For instance, there is no need to locate the TBCAS antenna at the top of a radio tower.

Figure 4:
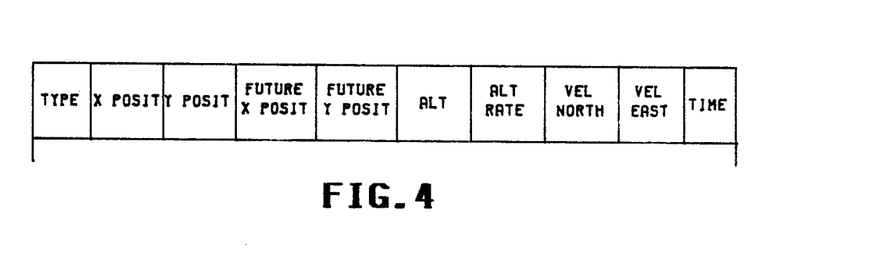
FIG. 4 identifies the data elements maintained in computer memory for each TBCAS report.

FIG. 4 presents columnar information related to the report table carried in the display/navigation microprocessor memory. The report table may be visualized as a two dimensional array with each column reserved for a specific data element and each row containing all data elements for a given report. The rows are sometimes referred to as slots. The leftmost field, type, is used to select an appropriate display symbol for the four station types involved. Four posit(ion) fields are carried as x and y display coordinates relative to own aircraft and define the current and future position of the reporting station. The next four fields—alt, alt rate, velocity north and velocity east are formatted as in the received report. The clock time is the value of the microprocessor internal clock at the time of report entry. This is used by the display/navigation microprocessor to age individual reports, erasing them from the table at a predetermined time interval determined by traffic density and modifiable by the operator. All data elements within the report table are used by the display/navigation microprocessor to evaluate potential hazards and to construct the plan position display. Note that the report table is a dynamic device representing the real-time traffic situation. At any one moment a particular station may occupy two or more slots within the table depending upon the erase time element. Ideally the second report would arrive simultaneously with the erasure of the preceding report but the existance of several reports on the same station would only result in overwriting the display area used by that station and would not usually be visible to an observer. The opposite case, erasure before the arrival of a second report, would result in the disappearance of that station from the screen until a second report arrived.

Figure 5:
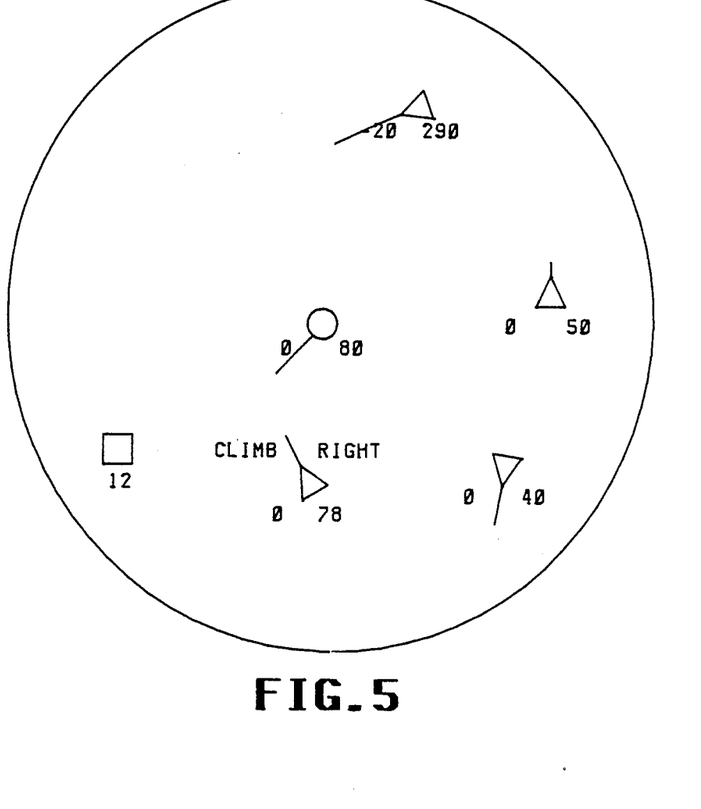
FIG. 5 is a representation of the display presented to the pilot in a medium density cruise traffic environment.

FIG. 5 shows the plan position display as developed by the TBCAS during normal cruise operation. Although the display is derived from geographic coordinates, all points of interest are interpreted as locations relative to own aircraft in linear measure i.e. yards east or west and north or south of own location with the top of the display representing true north. Own station is shwon as a circle symbol centered on the display. Its future geographic position is represented by the tip of the line or leader extending to the southwest as determined by heading and to a distance determined by speed. Below the own station symbol are numbers representing rate of climb (0 hundreds of feet per minute) and altitude (80 hundreds of feet). Both figures are taken from the most recent report transmitted by own station. To the north, a fast aircraft (length of leader) is descending from 29000 feet at a rate of 2000 feet per minute. Two aircraft to the east are proceeding on a level course and are some 3 to 4 thousand feet below own aircraft, thus represent no danger. A dangerous situation is developing to the south where an aircraft two hundred feet below own aircraft is penetrating protected airspace for own aircraft. The TBCAS notes the danger and simultaneously sounds an alert and displays the advisory "climb right" just over the hazard aircraft symbol. This location for the advisory serves as a pointer to direct attention to the object of greatest concern. Note that all advisories are directed to the pilot of own aircraft and not to the pilot of the hazard aircraft. The protected airspace varies depending upon operational conditions, may have separate vertical and horizontal distance values and may be changed by operator input. A square symbol is shown in the southwest quadrant with a reported pressure altitude of 1200 feet. This represents a geographic obstruction reaching to that altitude and were it to threaten the protected airspace a typical hazard alarm would sound. The scale for this display is one of two that are required by the system and is referred to as the long range or 20 mile scale.

Figure 6:
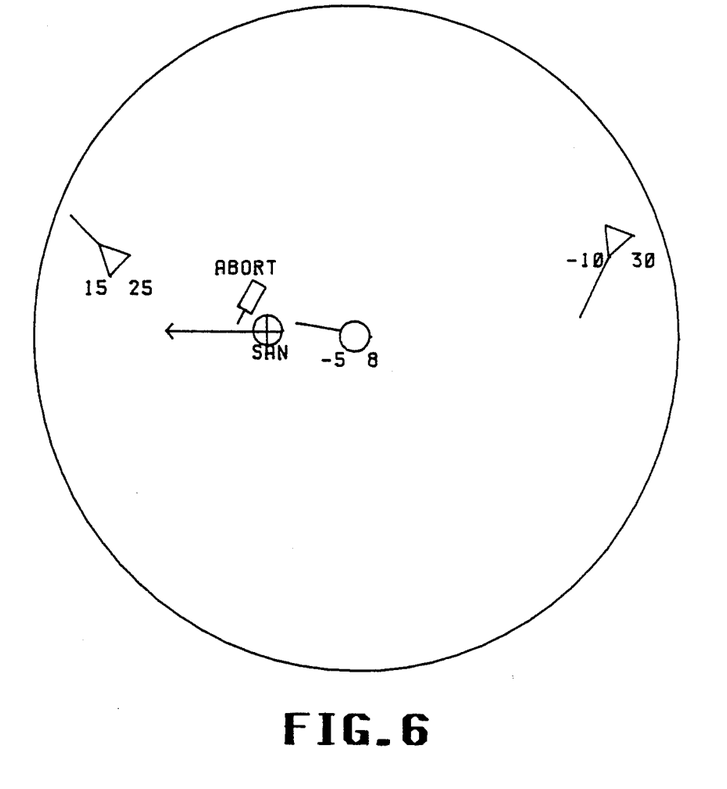
FIG. 6 is a representation of the display presented to the pilot during take-off and landing.

FIG. 6 is the short range presentation which is reverted to automatically during airfield manuevers. Own aircraft is at 800 feet altitude, descending at 500 feet per minute and approaching a runway some distance ahead. The runway beginning is denoted by the cross/circle symbol and its length is indicated by the connecting line to the arrowhead runway-end symbol. These symbols would be interchanged with opposite traffic flow. The label SAN below the runway beginning symbol indicate it is a San Diego, Calif. runway. This identification was taken from a table stored in read-only memory. Of most interest to the viewing pilot is the rectangular symbol identifying a ground vehicle, perhaps a firetruck, about to obstruct the runway. The TBCAS notes this intrusion and recommends an abort manuever together with an audible alarm. A departing aircraft is shown to the west climbing through 2500 feet at a rate of climb of 1500 feet per minute. Another aircraft is shown to the east descending through 3000 feet at a negative rate of climb of 1000 feet per minute. No grounded aircraft are shown in this display as administrative and air controller instruction will govern the transmission of position reports from such aircraft. These instructions will be firm in the requirement for transmission by aircraft moving across an active runway. The scale for this display is referred to as the short range or five mile range display and is automatically selected.

Figure 7:
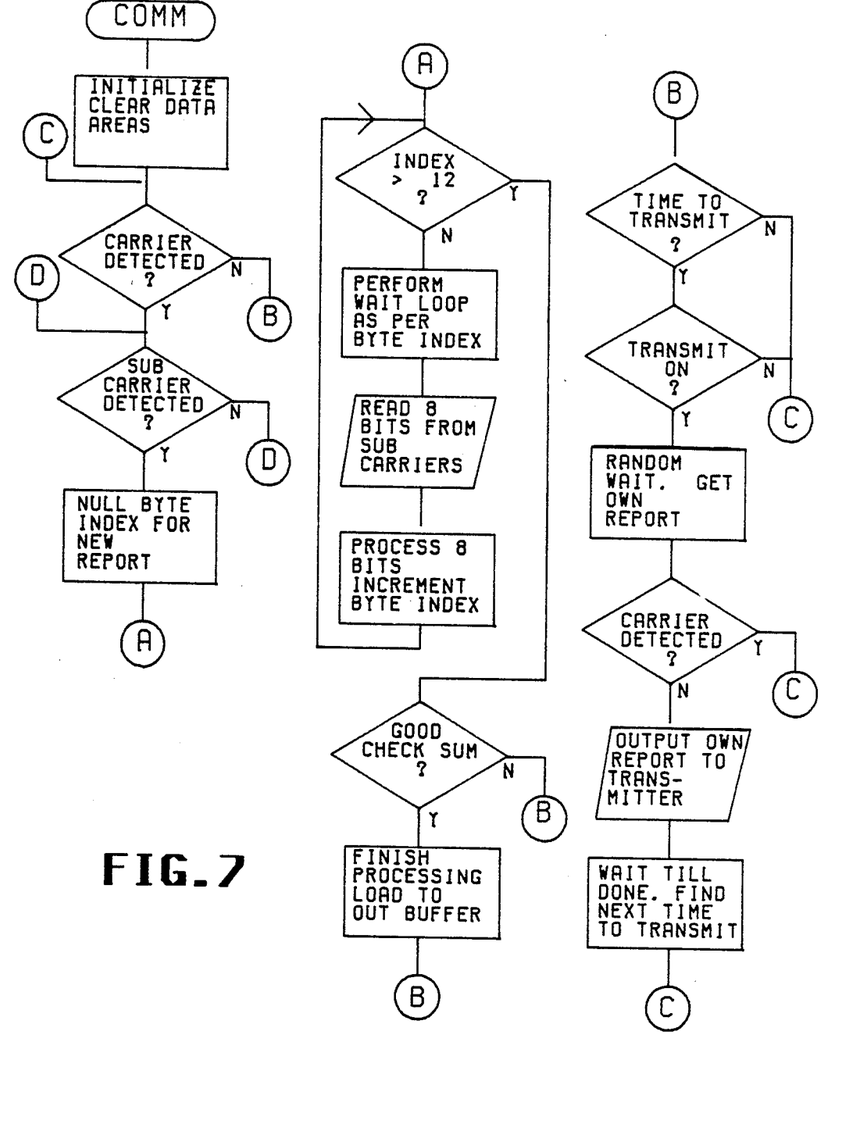
FIG. 7 is a data processing flowchart which specifies the program executed by the communications microprocessor.

FIG. 7 is a flowchart of the computer program COMM which is continuously executed by the communications microprocessor. The program resides in a read-only portion of memory and can be changed only by replacement of integrated circuit chips. Also in permanent memory cells are tables containing supplementary information relating to individual airports, runways, radio frequencies, magnetic variation, geographic locations, and trigonometric functions. These are used by the program to select navigational data sources, construct amplification advisories (for instance, names of mountain peaks) and to obtain nearly instantaneous values for trigonometric functions. While equations exist to permit the calculation of trigonometric values, their use is time consuming and the trade-off of memory space to save processing time is useful in this application. Other portions of memory are volatile read-andwrite memory cells used for data elements and working storage adequate for the computations and processing involved. The system provides a nominal 8 megahertz clock which controls all memory cycle timing and timing related to the transmission and decoding of the telemetry data. Linkage between the two microprocessors is obtained by the usage of a memory bank common to both with access controlled through a semaphore i.e. each microprocessor locks the other out when common memory is addressed.

The COMM program flowchart, FIG. 7, begins at the terminal symbol of the same name. All subsequent flow is down/right. Initialization consists of clearing storage areas to make ready for operations and is completed only once at system start. The telemetry receiver is checked for carrier detection to determine if another station is transmitting. If not, continue with check transmit time processing (via connector B) otherwise test the telemetry receiver for a sub-carrier detection. At this point the program loops (using connector D) until a sub-carrier is detected. The instant of sub-carrier detection establishes the time base for all subsequent report reception operations. At this point the receiver is synchronized with the transmitting station to obtain the 100 bits of data which comprises the sending stations report. This data will be received as 13 bytes (last 4 bits are not used) transmitted over a predetermined time period. The program nulls the byte index to make ready for the first 8 bits (first byte). The index is tested (via connector A) and if greater than 12 the program moves on to good check sum processing. Otherwise, a wait loop is executed whose duration depends upon the value of the byte index. The purpose of the wait loop is to permit the various sub-carriers to stabilize before their value is strobed or read into memory. The read subcarrier operation is then performed. The first byte contains check sum data which is merely stored, the byte index is incremented and the test of the index is repeated. The wait loop for the second byte is one of the longer waits as little time was used in processing the check sum. Succeeding waits will vary one from the other depending upon the amount of processing which can be performed on the 8 bits just received. The varying wait times are established within a permanent table indexed by the byte index. The processing accomplished by the COMM program within this loop essentially consists of converting the incoming latitude and longitude into X and Y displacements from own aircraft. The algorithm to accomplish this is as follows:

LATDIF=RECLAT−OWNLAT

LONDIF=RECLON−OWNLON

XPOS =LONDIF * COSLAT * K1

YPOS=LATDIF * K1 where

LAT=latitude
LON=longitude
DIF=difference
REC=record (received)
OWN=own aircraft or station
X=east/west
Y=north/south
POS=position
K1=constant derived from 2000 yards per angular minute and the resolution of the graphics display selected
COS=cosine The future X and future Y positions are determined by adding to the current positions the product of the pertinent velocity and the time factor selected (30 seconds default value). The value provided by the product is in yards. As previously implied, these calculations occur to the maximum extent possible during what would otherwise be dead time during the reception cycle. When the final byte has been received, i.e. the byte index exceeds 12, a comparison is made between the check sum and a count of all the "on" bits in the report. If they do not agree, a garbled report was received, continue with check time to transmit processing (via connector B). Otherwise, complete the calculations described above, load the report to an output buffer and set a flag to advise the DISP program of the report availability. Perform check time to transmit processing by subtracting the time of the last own report transmittal from the current time. If the elapsed time is less than the selected report interval continue with check for carrier detection at program entry (via connector C). Otherwise, test if transmission is authorized or enabled. If not, continue with check for carrier detection at program entry (via connector C). Otherwise, enter a random wait loop with a duration of 1 to 10 milliseconds. This random wait avoids interference which could result from several stations attempting to transmit simultaneously at the completion of another station report. Get the own station report from common memory as prepared by the DISP program. Verify that no other transmitter is on the air by checking for carrier detection again. If a carrier is detected, then perform check carrier detection at program entry (via connector C). Otherwise, output the own station report to the transmitter. When the transmission is finished log the transmit time for future time-to-transmit calculations and continue with check for carrier detection at program entry (via connector C.)

Figure 8:
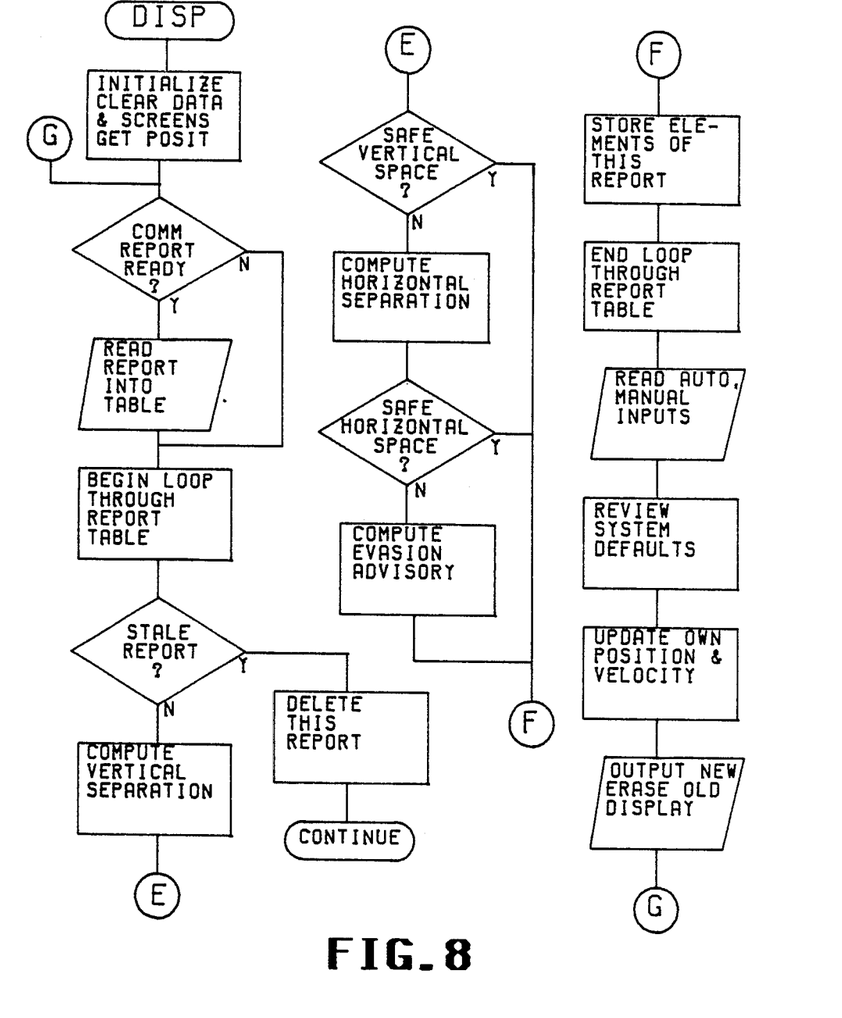
FIG. 8 is a data processing flowchart which specifies the program executed by the display/navigation microprocessor.

FIG. 8 is a flowchart of the DISP program continuously executed by the display/navigation microprocessor. This logic is supported by another processing unit that performs translations of tabular data into graphic displays for presentation by a display device. In the personal computer field, this unit is referred to as a graphics adapter. As many versions of these are on the market and improvements are being made on a frequent basis, no further descriptive material related to their use is provided. Some of the algorithms which follow omit logic to normalize angular values to a standard format i.e. insuring bounds lie between 0 and 360 degrees. Such logic is specific to the angular units selected—degrees, radians, binary angular measure, etc.

The program DISP, FIG. 8, begins at the terminal symbol of the same name. All subsequent flow is down/right. At system start an initialization sequence is executed which clears all working storage areas and display screen buffers. During initialization the program presents a number of queries to the operator which permit the selection of protected air space limits, designation of data sources and, if magnetic compass is selected as a source for heading, allows operator modification of an internal magnetic compass deviation table to make it specific to own aircraft. The queries are presented as text on the face of the display screen and are responded to via a control panel similar to those found on automatic bank teller machines. As a final step in initialization, the current position of own aircraft is determined. If Global Positioning System data is available it will be taken with no modification. Other radio navigation systems can be used by reference to read-only memory tables listing their identification and geographic location. Should none of these be available the program places own aircraft at some predetermined distance down the runway from the circular runway symbol. The control panel also has two pair of detented knobs allowing modification to latitude and longitude in fine and coarse increments. The knobs associated with each coordinate are concentric and allow the operator to quickly reposition own aircraft using only the sense of touch. An important application for this feature arises when a reposition instruction is received from an air controller who notes a disparity between the airplanes radar location and the position being reported by TBCAS. The pilot responds by manipulating the relevant knobs without taking his attention from other instruments. When the initialization is complete the TBCAS is in receive only mode and will remain there until the operator deliberately switches to transmit mode as directed by some authoritative source. A test is then made to see if a COMMunications report is ready. If not, begin looping through the report table, otherwise retrieve the latest COMM report from common memory and place it in the report table in the first blank slot. Perform looping through the report table as follows. Test the age of the report by subtracting the tabled receive time from the current clock time. If the report is stale, i.e. is older than a predetermined amount of time, delete the report from the table and continue with the next report. Otherwise compute the vertical separation between own aircraft and the reporting station then test that separation (via connector E) for safe passing distance. The algorithm to do this is

FOALT=OALT+ODH * FTIME

FRALT=RALT+RDH * FTIME

IF ABS (OALT−RALT)>VMIN AND

ABS (FOALT−FRALT)>VMIN THEN CONTINUE where
F=future
O=own
R=report (received)
ALT=altitude
DH=rate of climb
TIME=time interval (default to 30 seconds)
VMIN=specified safe vertical separation distance
ABS=absolute If the vertical separation is adequate, then perform store report elements (via connector F). Otherwise compute the horizontal separation and test for safe passing distance as follows
B=arctan RXPOS/RYPOS
CXVEL=RXVEL−OXVEL
CYVEL=RYVEL−OYVEL
CANG=arctan CXVEL/CYVEL
CVEL=SQRT (CXVEL * CXVEL+CYVEL * CYVEL)
CMOV=CANG−B'
DR=(CVEL * cos(CMOV))/0.563
DD=(CVEL * sin(CMOV))/0.563 where
B=true bearing of reporting station
B'=reciprocal of true bearing B
R=reported
O=own
C=combined
CANG=true direction of relative movement line
SQRT=square root
CMOV=angle between true bearing and relative movement line
DR=rate of change of range (range rate)
DD=deflection rate
0.563=conversion factor for yards/second to knots
then conduct safety test If DR>−30 THEN CONTINUE which states that a closing station approaching at less than 30 knots can be ignored. This would exclude aircraft approaching or past the closest point of approach as well as aircraft heading for a parallel runway or essentially traveling in formation with own aircraft, and is intended for use only at cruise altitudes. The 30 knot figure is an example only and should be predetermined by competent authority. If this report meets this test, then perform store report elements (via connector F) otherwise conduct a second safety test

IF ABS(DD)>100 THEN CONTINUE which states that stations having a high deflection rate can be ignored. If this test finds the report to be non-threatening, then perform store report elements (via connector F). For reports that are not excluded to this point, calculate the horizontal separation using the future position of both own aircraft and the reporting station as follows

FXDIF=FRXPOS−FOXPOS

FYDIF=FRYPOS−FOYPOS

HSEP=FXDIF * FXDIF+FYDIF * FYDIF

IF HSEP>HMIN * HMIN THEN CONTINUE where

F=future
DIF=difference
HSEP=horizontal separation squared
HMIN=minimum horizontal separation distance Using the squared horizontal separation avoids the need to determine the square root which is time consuming and not essential to the logic. While HMIN is shown to be squared for each test, a more efficient method would perform this calculation once saving the result until a change was ordered by the operator or by automatic scale selection logic. If this test fails to exclude the reporting station, a hazard is deemed to exist and calculations of an evasion manuever are made. The outputs of this processing state are single bit indicators referred to as flags. These are later converted to alphabetic form for display.

IF TYPE=GROUND VEHICLE OR
TYPE=GROUNDED AIRCRAFT THEN
SET ABORT FLAG TO 1

Aircraft are considered grounded when their altitude matches the runway altitude within 50 feet. If the abort flag is set all further maneuvering calculations are bypassed.

```
IF TYPE EQ GEOPOINT THEN
  BEGIN
     SET AWAY FLAG TO 1
     SET CLIMB FLAG TO 1
  END
IF TYPE=AIR THEN
  BEGIN
     OWNHEAD=arctan (OXVEL/OYVEL)
     RECHEAD=arctan (RXVEL/RYVEL)
     HEADDIF=OWNHEAD−RECHEAD
     IF ABS (HEADDIF)<90 THEN
        SET AWAY FLAG TO 1
     IF FRALT=FOALT THEN BEGIN
        IF B>180 THEN SET DIVE FLAG TO 1
          ELSE SET CLIMB FLAG TO 1
        END
     IF FRALT<FOALT THEN
        SET CLIMB FLAG TO 1 ELSE
        SET DIVE FLAG TO 1
  END "of type=air"
SET RIGHT FLAG TO 1
IF AWAY FLAG=1 THEN
  BEGIN
     RELB=B−OWNHEAD
     IF RELB<180 THEN BEGIN
        SET LEFT FLAG TO 1 THEN
        SET RIGHT FLAG TO 0
     END "of relb<180"
  END "of if away flag"
``` where
B=true bearing of the other aircraft
RELB=relative bearing of the other aircraft At this point, evasion manuever flags have been set to cause the display to indicate abort, dive/climb, right-/left as appropriate. This logic is tentative and would require approval by competent authority. Briefly, when collision is imminent an abort recommendation is given for all runway encounters as the decision to accelerate or brake is a marginal call left to the pilot. All incidents with geographic points result in a recommendation to climb and turn away. If an aircraft shows the same future altitude as own aircraft, the westernmost aircraft is ordered to climb and the easternmost ordered to dive. If the future altitudes of the two aircraft differ, dive and climb recommendations are given to increase the separation. Right turns are ordered for both aircraft except when their headings are within 90 degrees of one another in which case they are both ordered to turn away from each other. Additional safeguards would include avoiding recommendations to dive within 1000 feet of the nearest geographic point altitude and avoiding a turn into an even greater danger. Such logic would depend upon the more basic manuevers described here and may be developed after these are firmly established.

All elements required for the display of this report have been calculated. These are stored in a display screen table (via connector F) for display at the next update and the loop continues at the stale report test. Succeeding reports in the report table are each given the same processing until the loop through the report table completes as indicated by an index. At this point all automatic and manual inputs are read to update position, heading, speed, altitude and rate of climb. The heading and speed are converted to x and y velocities using well known trigonometric equations. Reposition entries from the operator are taken and applied at this time. Application consists of preparing a new latitude/-longitude value for transmission and of modifying every x and y position in the report table and in the graphics screen table to agree with the amount and direction of the reposition. Additionally, if dead reckoning is the source of position information, the amount and direction of the reposition is used to compute values of wind speed and direction for use in all succeeding dead reckoning calculations. The system defaults are reviewed based on proximity to a runway symbol and true altitude. If a runway symbol is within five miles and the altitude difference between the runway and own aircraft is less than 800 feet, a landing or take-off is assumed in progress and all short range defaults (includes range scale, safe separation distances, etc.) are invoked. An update of all x and y positions in the report table is made to account for the apparent motion imparted to every report caused by own aircraft movement since the last update. This consists of computing the yards traveled and adding them to the current values. The new display data is passed to the graphics adapter and processing proceeds at the COMM report ready test (via connector G) at program entrance.

It is the intent of this processing to accomplish display screen updates at least 16 times per second which provides a nonblinking and constant motion presentation of the local traffic environment.

The description of TBCAS thus far has concentrated upon the system as primarily for the benefit of individual pilots to enable them to monitor the air traffic situation within their limited geographic area. This orientation accounts for the lack of aircraft identification data and other alphanumeric read-outs on the display. This type of information is not essential to the prevention of collision and if provided would tend to obscure or clutter the display. A benign example of this effect is revealed in FIG. 5 where the minus sign attached to the rate of climb digits for the northernmost aircraft is overwritten by the leader line. Another factor compelling a spartan display is the time element required for the transmission and processing of non-essential data. Traffic situations capable of stressing either resource are not difficult to visualize. Despite this limitation the TBCAS could render valuable service to the air traffic control center. Outlying geographic obstruction stations can be hard-wired to provide a copy of their report table to the center at very high data rates. Using these reports to formulate either an overlay of the normal radar display or a separate mosaic of the surrounding air traffic situation would present no engineering difficulties. Unlike radar, the display would not be range limited and would not depend upon radar reflectivity for its operation. The utility of TBCAS in this application would seem to be very great and make it a worthy candidate for Federal Aviation Administration funding.

While all of the descriptive material presented is directed toward usage for aircraft collision prevention, the TBCAS is also appropriate for marine and railway traffic. The modifications required for each service would be unique but are self-evident and no further description for these applications is provided.

I claim:

1. An improved vehicular collision avoidance system of the type in which each vehicle, utilizing radio communication equipment, repeatedly broadcasts a formatted report of its current position, as taken from on-board navigation equipment, in latitude-longitude or cartesian coordinate format together with its current altitude and concurrently receives such said reports from other vehicles and in which digital computing equipment is contained within each vehicle for the purpose of constructing a geographic display of the current vehicular traffic situation for human interpretation and also to generate visual and audible alarms whenever a minimum current range to another vehicle is detected, wherein the improvement comprises (a) the installation of geographically fixed systems, hereafter collectively with vehicular systems referred to as stations, to mark runways and prominent fixed obstructions thereby establishing useful checkpoints to improve visual navigation as well as enabling a more meaningful geographic display;

(b) the expansion of said report to include checksum validation data thereby permitting a checksum validation of each report received, a type identification value thereby enabling the display of a unique type symbol for each of the various fixed and vehicular stations, velocity north, velocity east, and rate-of-climb thereby permitting the calculation of the future position of each reporting vehicle;

(c) the inclusion of dedicated computing equipment to control said communications equipment principally by monitoring carrier detection circuitry of the radio receiver to inhibit own transmissions when another station is transmitting and by rejecting reports that fail checksum validation tests thereby significantly reducing the false alarm rate;

(d) the expansion of said display/alarm computing equipment to include logic means for electrical linkage to said communications computing equipment and to on-board motion sensing instruments; and also to include logic means to perform the navigation functions of maintaining a dead-reckoning position, calculating a compensating wind to correct for system errors, constructing said reports for use by said communications computing equipment, calculating the future positions of own and all currently held vehicles, comparing those future positions and providing evasive maneuver recommendations when a minimum future range to a vehicle or fixed obstruction occurs that is not coincident with non-hazard values of range rate, bearing rate and climb rate thereby significantly reducing the false alarm rate;

(e) the inclusion of reference data means at each station for the provision of permanently recorded, machine-readable navigational information related to the identification, geographic location, and operational characteristics of each aid to navigation and to include a set of trigonometric function values for use in collision computations;

(f) the provision of an operator input device to provide means for instantaneous geographic reposition of own station using only the sense of touch thereby enabling rapid pilot compliance with reposition instructions from air controllers as well as making possible precise position adjustments during ground maneuvers;

(g) the expansion of said geographic display to provide both current and future positions of own and other vehicles as well as name identification for at least some of the geographically fixed stations thereby making said display interpretable at a glance as well as more meaningful in a geographic sense.

* * * * *